Oct. 4, 1938. E. F. WILEY Re. 20,878

AWNING TYPE WINDOW

Original Filed Aug. 29. 1932 2 Sheets-Sheet 1

INVENTOR.
Esmond F. Wiley.

BY Townsend & Loftus
ATTORNEYS.

Oct. 4, 1938. E. F. WILEY Re. 20,878

AWNING TYPE WINDOW

Original Filed Aug. 29, 1932 2 Sheets-Sheet 2

INVENTOR.
Esmond F. Wiley

BY
Townsend and Loftus,
ATTORNEYS.

Reissued Oct. 4, 1938

Re. 20,878

UNITED STATES PATENT OFFICE 20,878

AWNING TYPE WINDOW

Esmond F. Wiley, Oakland, Calif., assignor to Universal Window Company, Berkeley, Calif., a corporation of California Original No. 1,934,290, dated November 7, 1933, Serial No. 630,897, August 29, 1932. Application for reissue September 8, 1937, Serial No. 162,911

7 Claims. (Cl. 189—37)

This invention relates to awning type windows.

Prior to my invention awning type windows have been produced which include a plurality of superimposed oscillatory sashes mounted within a single frame. These sashes were connected together so that the sashes would operate in unison. This connection, however, could be rendered ineffective to enable the sashes to be opened or closed separately, but in order to render the connection ineffective it was necessary to manipulate operating devices mounted on the window frame. This has not proven entirely satisfactory for various reasons and therefore it is the principal object of the present invention to provide an improved awning type window wherein by operation of one sash all sashes may be connected together for operation in unison, or the operating sash may be disconnected from the remainder and operated independently while the sashes controlled by it are left at any desired angle between the angles occupied by them when they are fully opened and when they are fully closed.

In carrying the invention into practice I provide a window frame fitted with a plurality of swinging sashes arranged one above the other as in conventional awning type windows. An operating mechanism is provided for connecting all of the sashes together. This mechanism, however, enables one sash to be connected thereto or disconnected therefrom by oscillation of the said sash so that by operating the same all the sashes may be operated in unison or the said sash may be independently operated. This, of course, renders the use of auxiliary devices requiring operation to connect and disconnect the sashes as in prior practice unnecessary.

One form which the invention may assume is exemplified in the following description and illustrated by way of example in the accompanying drawings, in which.

Figure 1:
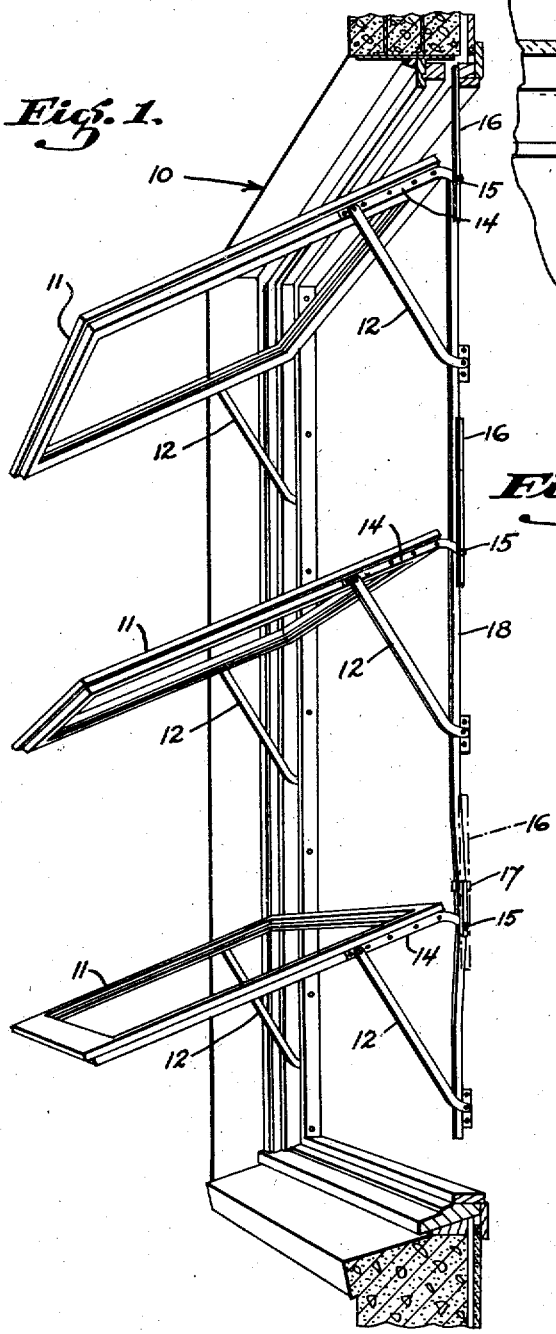
Fig. 1 is a perspective view of a window frame with parts in section showing the sashes mounted therein and disposed in open position.
Figure 2:
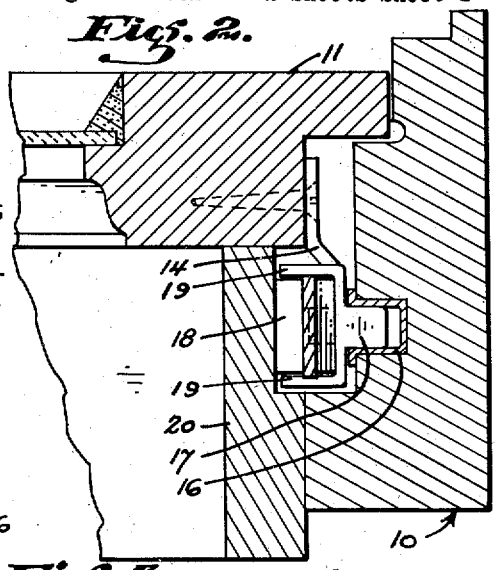
Fig. 2 is a transverse sectional view through one side of the frame showing the mounting of the travelling bar and of the lower sash shoe.
Figure 3:
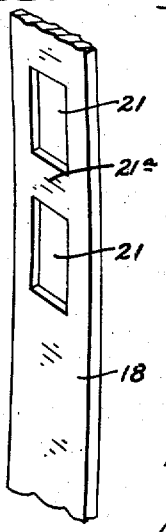
Fig. 3 is a fragmentary view in perspective of the portion of the travelling bar formed with the latch openings.
Figure 4:
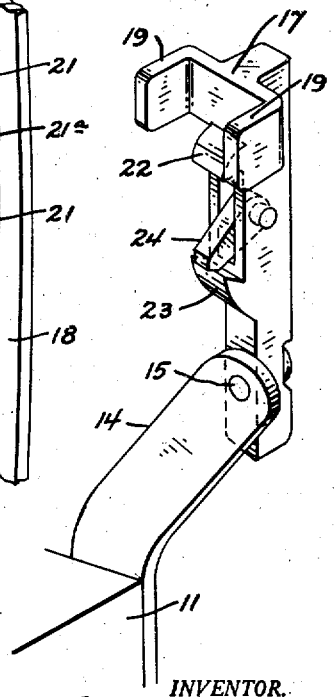
Fig. 4 is a perspective view of the shoe carried by the lower sash.
Figure 6:
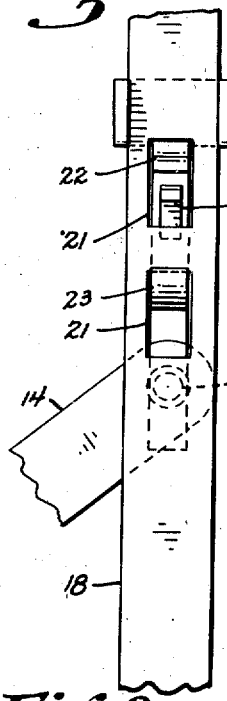
Figs. 6 and 7 are fragmentary views showing the latching mechanism in the position it assumes when it is in engagement for moving the sashes in unison to closed position.
Figure 7:
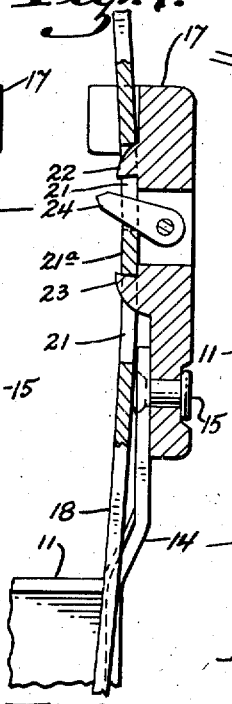
Figure 5:
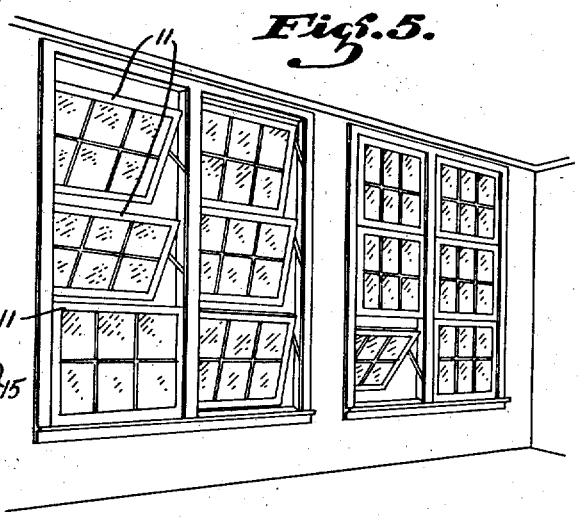
Fig. 5 is a perspective view of the interior of a room showing four complete windows in the wall thereof with the sashes of the windows in different positions.
Figure 8:
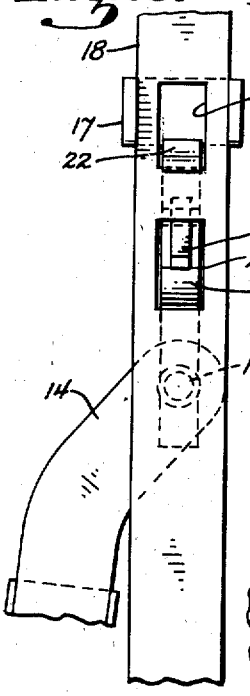
Figs. 8 and 9 are fragmentary views of the latching mechanism showing the same in the position it assumes when all of the sashes are connected together for opening movement.
Figure 9:
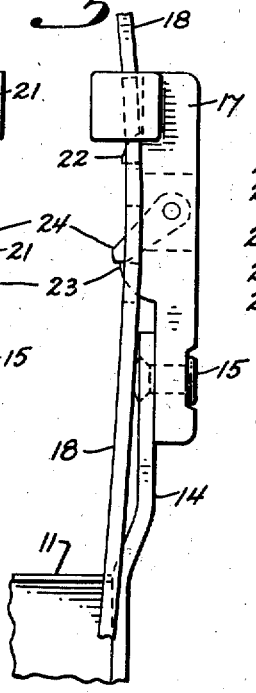

Referring more particularly to the accompanying drawings, 10 indicates an awning type window frame of suitable construction and dimensions. This frame is fitted with three swinging sashes 11 capable of oscillation or swinging movement in a vertical plane. It will be noticed that the sashes are disposed one above the other as in conventional awning type window design and that their meeting rails are so formed to provide a suitable tight joint therebetween when the sashes are in closed position.

Each sash is connected to the frame by a pair of fulcrum links 12 arranged one at each side of the sash intermediate the side rails thereof and the adjacent jamb. The fulcrum links of each pair are in horizontal alignment and their upper ends are pivoted to the sash intermediate the upper and lower ends thereof, and the lower ends of the fulcrum links are pivoted to the jambs of the frame as illustrated.

Each sash is fitted with a pair of arms 14 at its upper end which are in horizontal alignment and each is secured to the side rails of the sash. The upper extremities of these arms are fitted with laterally projecting trunnions 15 which slidably and pivotally engage guideways 16 formed in the jambs of the frame. This mounting of the sashes permits them to be oscillated in a vertical plane.

The arms 14 of the lowermost sash are each fitted with a reciprocable latch shoe 17 having a portion reciprocably engaging the adjacent guideway 16. The arms 14 of the lower sash are pivotally connected to the shoe so that the lower sash may have the same operating action as the upper sash.

Arranged vertically at each side of the frame interiorly thereof is a travelling bar 18 pivotally connected to the arms 14 of the uppermost sashes. These travelling bars depend from the uppermost sash almost the entire height of the window opening as illustrated and at a point adjacent the upper end of the lower sash a bend is placed therein so that they will be urged into yielding engagement with the latch shoes 17 of the lower sash. It will be noticed that these latch shoes are each provided with a guideway 19 which embraces the travelling bars to maintain the shoes and the travelling bars in proper cooperative positions. The spring action of the travelling bars is obtained by engagement thereof with the stop 20 of the frame.

It is to be understood, however, that the travelling bars may be placed into yielding engagement with the shoes by any other spring means and my invention is not limited to utilizing the inherent spring action of a bend or curvature in the travelling bars to maintain the same in proper cooperative relation to the latching shoes 17.

At a point adjacent the latching shoes 17 each travelling bar is provided with a pair of latch openings 21 which are spaced vertically apart to form a transverse latch bar 21*a* therebetween. These latch openings 21 and latch bar 21*a* cooperate with a pair of opposed latch dogs 22 and 23 formed on each latching shoe 17. Intermediate these latching dogs 22 and 23 is a pivotal tumbler 24. The construction of the travelling bars and latching shoes 17 is such that the lower sash may be opened independently of the upper sash or by oscillation of the lower sash the latching dogs 22 of the shoes 17 may engage the upper edges of the latch bars 21*a* so that the sashes will be opened in unison. Similarly after all the sashes have been opened, the lower sash may be moved to closed position without disturbing the upper sashes, but, if desired, the lower sash by oscillation thereof may be connected with the upper sash by placing the latching dogs 23 in engagement with the lower edges of the latching bars 21*a* so that closing movement of the lower sash will be accompanied by closing movement of the upper sashes. The tumblers 24 are provided to normally prevent engagement of the latching dogs 22 and 23 with the latching bars 21*a*.

In operation of the window, assuming that the sashes are all in closed position and it is desired to open only the lower sash, the lower rail is moved outwardly which will cause downward movement of the latching shoes 17. During this movement the tumblers will engage the upper edges of the latching bars 21*a* between the openings 21 in the travelling bars and present an inclined surface so that the latching dogs 22 of the shoes 17 will not project through the openings 21 and consequently will not be enabled to engage the edges presented at the ends of these openings, and the shoes 17 will travel independently of the travelling bars. During this time, of course, the inherent resiliency of the travelling bars will enable the latter to be moved laterally of the jambs of the frame to enable the latching dogs 22 and tumblers 24 to pass over the outer surfaces thereof.

Figure 10:
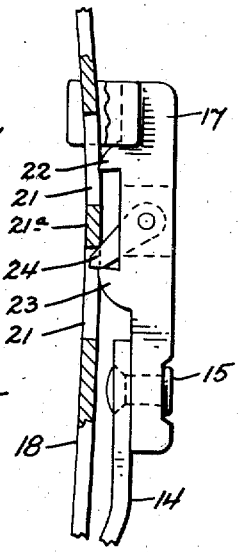
Figs. 10 and 11 are fragmentary views of the latching mechanism showing the position it assumes when the lower sash is operated independently of the upper sashes.

In closing the lower sash independently, the lower rail of the sash is moved inwardly and the tumblers 24 will assume the position as shown in Fig. 10, and prevent engagement of the latching dogs 23 with the travelling bars so that the shoes will move independently of the travelling bars to enable independent closing of the lower sash.

However, when it is desired to open the upper sashes simultaneously with the lower sash, the lower rail of the bottom sash is moved outwardly a short distance. This causes the shoes 17 to move downwardly relative to the travelling bars until the tumblers 24 pass the latch bars 21*a*. The tumblers then assume their lowermost positions either by gravity or because of engagement with the latch bars 21*a* upon reverse movement of the sash. The lower rail of the sash is then moved inwardly a short distance sufficient to enable the latching dogs 22 to pass through the upper latching openings 21. The inherent spring action of the travelling bars then causes the latching dogs 22 to pass through the openings 21 so that outward movement of the lower rail of the sash will cause engagement of the dogs 22 with the upper edges of the latching bars 21*a* of the travelling bars, so that upon further outward movement of the lower sash, the travelling bars and the shoes 17 will move in unison and cause all of the sashes to open.

Figure 11:
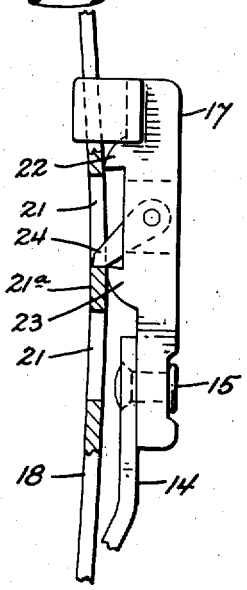

Assuming that the sashes are all in open position and it is desired to close them in unison, the lower sash is moved inwardly which causes the shoes 17 to move upwardly relative to the travelling bars. The tumblers 24 will be in their lowermost positions so that the latching dogs 23 will pass over the latching bars 21*a* as shown in Fig. 10. This inward movement of the lower edge of the lower sash is continued until the parts assume the position shown in Fig. 11. When this position is reached, the tumblers 24 will project through the upper openings 21 in the travelling bars so that the shoes may be moved downwardly by outward movement of the sash. This outward movement is sufficient to enable the latching dogs 23 to project through the lower openings 21 so that further inward movement of the sash will cause engagement of the latching dogs 23 with the underside of the latching bars 21*a*, and further movement will, of course, be accompanied by movement of all the sashes in unison.

If all three sashes are open and it is desired to close only the lower sash, initial closing movement of the lower sash is continued until the lower sash is closed, the position of the tumblers being such that the tumblers and dogs 23 will ride over the travelling bars, leaving the upper sashes in their open positions.

If it is desired to close the upper sashes when the lower sash is in closed position, it is merely necessary to move the lower sash to an open position approximately coinciding with that of the other sashes until the tumblers 24 project through the upper openings 21. This movement of the sash is then continued to enable the dogs 23 to project through the lower openings 21, and then closing movement of the lower sash will be accompanied by closing movement of all the sashes.

It is obvious from the foregoing that by manipulation of the operating sash, which is the bottom one in this instance, all of the sashes may be operated in unison or the bottom sash may be operated independently of the remainder. The structure disclosed makes possible the release of the travelling bars, and consequently the upper sashes are disposed at any desired angle between the angles occupied by them when they are fully opened and when they are fully closed. This is a decided improvement over structures in which a control sash is capable of releasing and engaging its controlled sashes only when the controlled sashes have been left at a predetermined angle.

It is desired to point out that this operation of the sashes is accomplished without the use of auxiliary devices which is very desirable in windows of this character, and while I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A window of the character described comprising a frame, a plurality of swinging sashes mounted in said frame, and connecting mechanism associated with said sashes for connecting said sashes together, said mechanism being capable of operation automatically by manipulation of one sash while the other sashes are disposed at any desired angle to connect said sashes together for operation in unison or permit independent operation of said one sash.

2. A window of the character described comprising a frame, a plurality of swinging sashes mounted in said frame, connecting mechanism associated with said sashes for connecting said sashes together, said mechanism including latching means associated with one sash and actuated automatically by swinging movement thereof to connect and disconnect said sash from said connecting mechanism while the other sashes are disposed at any desired angle.

3. A window of the character described comprising a frame, a plurality of swinging sashes mounted in said frame, connecting mechanism associated with said sashes for connecting said sashes together, said mechanism including reciprocable members connected with the uppermost sashes, and a latch mechanism associated with the bottom sash and adapted to connect the same to said members whereby all the sashes will operate in unison, said latch mechanism being capable of being automatically rendered effective and ineffective by operation of said bottom sash while the other sashes are disposed at any desired angle.

4. A window of the character described comprising a frame, a plurality of swinging sashes mounted in said frame, connecting mechanism associated with said sashes for connecting said sashes together, said mechanism including reciprocable members interposed between the sashes and frame and adapted to be connected with the sashes so that they will operate in unison, a latch mechanism carried by one sash to form a connection between the same and said members, said latch mechanism being automatically rendered effective and ineffective by swinging movement of said sash while the other sashes are disposed at any desired angle.

5. A window of the character described comprising a frame, a plurality of swinging sashes mounted in said frame, connecting mechanism associated with said sashes for connecting said sashes together, a travelling bar arranged at the side of the frame intermediate the sashes and connected to the uppermost sashes whereby reciprocable movement of said bar will be accompanied by swinging movement of said uppermost sashes, a latching mechanism carried by the lowermost sash including a tumbler engageable with the travelling bar upon swinging movement of said sash to connect and disconnect the lower sash from the travelling bar.

6. A window of the character described comprising a frame, a plurality of swinging sashes mounted in said frame, connecting mechanism associated with said sashes for connecting said sashes together, said mechanism including a travelling bar at each side of the frame intermediate the sashes and the frame and connected to the uppermost sashes in a manner whereby reciprocation thereof will impart swinging movement to the sashes, latch mechanisms carried by the bottom sash including tumblers engageable with said travelling bars upon swinging movement of the bottom sash to condition said latch mechanisms to engage and release the travelling bars.

7. A window of the character described comprising a frame, a plurality of swinging sashes mounted in said frame, connecting mechanism associated with said sashes for connecting said sashes together, said mechanism including a reciprocable travelling bar at each side of the frame intermediate the sashes and the jamb of the frame, said travelling bars being connected to the uppermost sashes in a manner whereby reciprocation thereof will impart swinging movement to the sashes, a latch mechanism carried at each side of the bottom sash, said latch mechanisms being arranged in cooperative relation to the travelling bars and capable upon swinging movement of the lower sash to be automatically connected to the travelling bars while the other sashes are disposed at any desired angle so that all of the sashes will operate in unison or be disconnected therefrom to enable independent operation of the bottom sash.

ESMOND F. WILEY.